US012598213B2

(12) United States Patent
Arora et al.

(10) Patent No.: US 12,598,213 B2
(45) Date of Patent: Apr. 7, 2026

(54) LOCATION-BASED POLICY ENFORCEMENT FOR DATA PROCESSING SYSTEMS USING OUT-OF-BAND METHODS

(71) Applicant: Dell Products L.P., Round Rock, TX (US)

(72) Inventors: Mohit Arora, Frisco, TX (US); Abeye Teshome, Austin, TX (US); Richard M. Tonry, Georgetown, TX (US); Bassem El-Azzami, Austin, TX (US); Vinodkumar Vasudev Ottar, Mckinney, TX (US); Luis Antonio Valencia Reyes, Waxahachie, TX (US); Adolfo Sandor Montero, Pflugerville, TX (US); Rajaravi Chandra Kollarapu, Allen, TX (US)

(73) Assignee: Dell Products L.P., Round Rock, TX (US)

( * ) Notice: Subject to any disclaimer, the term of this patent is extended or adjusted under 35 U.S.C. 154(b) by 179 days.

(21) Appl. No.: 18/498,294

(22) Filed: Oct. 31, 2023

(65) Prior Publication Data

US 2025/0141925 A1    May 1, 2025

(51) Int. Cl.
*H04L 9/40* (2022.01)
(52) U.S. Cl.
CPC ............ *H04L 63/18* (2013.01); *H04L 63/107* (2013.01); *H04L 63/20* (2013.01)
(58) Field of Classification Search
CPC .............................. H04L 63/18; H04L 63/107
See application file for complete search history.

(56) References Cited

U.S. PATENT DOCUMENTS

| | | |
|---|---|---|
| 7,200,105 B1 | 4/2007 | Milliken |
| 7,599,907 B2 | 10/2009 | Havewala et al. |
| 8,020,192 B2 | 9/2011 | Wright et al. |
| 8,490,163 B1 | 7/2013 | Harsell et al. |
| 8,850,186 B2 | 9/2014 | Yamauchi |

(Continued)

OTHER PUBLICATIONS

Qayyum et al., "Awareness of Kill Switch Application Among Mobile Phone Users" 2019 UK/ China Emerging Technologies (UCET), Glasgow, UK, 2019, pp. 1-5, doi:10.1109/UCET.2019. 8881876 ( 5 pages).

(Continued)

*Primary Examiner* — Hieu T Hoang
(74) *Attorney, Agent, or Firm* — WOMBLE BOND DICKINSON (US) LLP

(57) ABSTRACT

Methods and systems for managing a data processing system are disclosed. A management controller of the data processing system may obtain location data for the data processing system via an out-of-band communication channel. The management controller may identify policies based on the location data, and make an identification regarding whether the data processing system is operating out of compliance with respect to the policies. If the data processing system is operating out of compliance, then the management controller may perform an action set to update operation of the data processing system in a manner that improves compliance of the data processing system with respect to the policies. The data processing system may provide computer-implemented services based on the updated operation.

20 Claims, 7 Drawing Sheets

(56) References Cited

U.S. PATENT DOCUMENTS

| | | | |
|---|---|---|---|
| 9,191,781 B2 | 11/2015 | Kumar | |
| 9,246,678 B2 | 1/2016 | Nayshtut et al. | |
| 9,349,009 B2 | 5/2016 | Rivera | |
| 9,392,021 B1 | 7/2016 | Labana | |
| 9,413,783 B1 * | 8/2016 | Keogh | H04L 63/1458 |
| 9,721,111 B2 | 8/2017 | Cavanaugh | |
| 9,721,175 B2 | 8/2017 | Kursun et al. | |
| 9,785,491 B2 | 10/2017 | Cilfone et al. | |
| 10,021,669 B2 * | 7/2018 | George | H04W 4/40 |
| 10,163,105 B1 | 12/2018 | Ziraknejad et al. | |
| 10,169,571 B1 | 1/2019 | Attfield et al. | |
| 10,225,158 B1 | 3/2019 | Lu | |
| 10,395,039 B2 | 8/2019 | Khatri et al. | |
| 10,630,489 B2 | 4/2020 | Hughes | |
| 10,678,555 B2 | 6/2020 | Johansson et al. | |
| 10,841,295 B1 | 11/2020 | Pecen et al. | |
| 10,887,276 B1 | 1/2021 | Parulkar | |
| 11,563,565 B2 | 1/2023 | Yang et al. | |
| 11,704,384 B2 | 7/2023 | Murphy et al. | |
| 2006/0280195 A1 * | 12/2006 | Lopez, Jr. | H04L 69/14 |
| | | | 370/465 |
| 2007/0055740 A1 * | 3/2007 | Luciani | H04L 67/34 |
| | | | 709/217 |
| 2007/0112962 A1 | 5/2007 | Lewontin | |
| 2007/0113266 A1 | 5/2007 | Ross | |
| 2009/0086731 A1 | 4/2009 | Lee | |
| 2009/0182799 A1 * | 7/2009 | Huang | H04L 41/00 |
| | | | 709/201 |
| 2009/0300717 A1 | 12/2009 | Mandava | |
| 2010/0019730 A1 | 1/2010 | Chueh | |
| 2010/0191837 A1 * | 7/2010 | Linden | H04L 41/0806 |
| | | | 709/220 |
| 2012/0032834 A1 | 2/2012 | Weeks | |
| 2012/0046025 A1 * | 2/2012 | Das | H04W 48/08 |
| | | | 455/422.1 |
| 2012/0151223 A1 * | 6/2012 | Conde Marques | |
| | | | G06F 21/6218 |
| | | | 713/193 |
| 2012/0166605 A1 * | 6/2012 | Chou | G06F 11/3006 |
| | | | 709/223 |
| 2012/0202447 A1 * | 8/2012 | Edge | H04W 8/16 |
| | | | 455/411 |
| 2013/0086262 A1 | 4/2013 | Bhadri | |
| 2013/0210464 A1 * | 8/2013 | Mittal | H04W 28/0226 |
| | | | 455/456.5 |
| 2013/0219171 A1 | 8/2013 | Gearhart | |
| 2013/0246199 A1 | 9/2013 | Carlson | |
| 2013/0268697 A1 * | 10/2013 | Lambert | G06F 13/4022 |
| | | | 710/11 |
| 2013/0347089 A1 | 12/2013 | Bailey | |
| 2014/0082754 A1 * | 3/2014 | Guo | G06F 21/00 |
| | | | 726/30 |
| 2014/0173093 A1 * | 6/2014 | Rabeela | H04L 61/5014 |
| | | | 709/224 |
| 2014/0181844 A1 | 6/2014 | Von Bokern | |
| 2014/0181891 A1 | 6/2014 | Von Bokern | |
| 2014/0181892 A1 | 6/2014 | Von Bokern | |
| 2014/0195704 A1 * | 7/2014 | Bhatia | G06F 11/3055 |
| | | | 710/105 |
| 2014/0208132 A1 | 7/2014 | Cheston | |
| 2015/0121506 A1 * | 4/2015 | Cavanaugh | G06F 21/6218 |
| | | | 726/16 |
| 2016/0378169 A1 | 12/2016 | Naeimi | |
| 2017/0277876 A1 | 9/2017 | Alameh et al. | |
| 2017/0289197 A1 | 10/2017 | Mandyam et al. | |
| 2017/0364712 A1 | 12/2017 | Munafo | |
| 2018/0006829 A1 | 1/2018 | Kravitz et al. | |
| 2018/0191733 A1 | 7/2018 | Kundu | |
| 2018/0253569 A1 | 9/2018 | Swierk | |
| 2019/0095352 A1 | 3/2019 | Poornachandran | |
| 2019/0156019 A1 | 5/2019 | Chen | |
| 2019/0173962 A1 | 6/2019 | Ben Ali | |
| 2020/0092332 A1 * | 3/2020 | Bhattathiri | H04L 63/20 |
| 2020/0137688 A1 * | 4/2020 | Gulbay | H04W 52/0229 |
| 2021/0168093 A1 * | 6/2021 | Andrews | H04L 63/20 |
| 2022/0083349 A1 * | 3/2022 | Chaganti | G06F 9/44505 |
| 2022/0222328 A1 | 7/2022 | Talib et al. | |
| 2023/0124661 A1 * | 4/2023 | Liu | G06F 21/64 |
| | | | 713/1 |
| 2023/0297701 A1 * | 9/2023 | Mouallem | G06F 21/62 |
| | | | 726/30 |
| 2023/0403555 A1 * | 12/2023 | Farooq | H04W 12/00 |
| 2024/0421916 A1 * | 12/2024 | Myron | H04B 11/00 |

OTHER PUBLICATIONS

Tu et al., "Understanding User's Behaviors in Coping with Security Threat of Mobile Devices Loss and Theft", 2012 45th Hawaii International Conference on System Sciences, Maui, HI, USA, 2012, pp. 1393-1402, doi: 10.1109/HICSS.2012.620 (10 pages).

Pfitzmann et al., "Trusting Mobile User Devices and Security Modules", in Computer, vol. 30, No. 2, pp. 61-68, Feb. 1997, doi: 10.1109/2.566159 (8 pages).

Ju et al., "Implementation of a Hardware Security Chip for Mobile Devices", in IEEE Transaction on Consumer Electronics, vol. 61, No. 4, pp. 500-506, Nov. 2015, doi: 10.1109/TCE.2015.7389805 (7 pages).

* cited by examiner

LOCATION-BASED POLICY ENFORCEMENT FOR DATA PROCESSING SYSTEMS USING OUT-OF-BAND METHODS

FIELD

Embodiments disclosed herein relate generally to managing data processing systems. More particularly, embodiments disclosed herein relate to systems and methods for managing operation of the data processing systems based on location data.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1A:
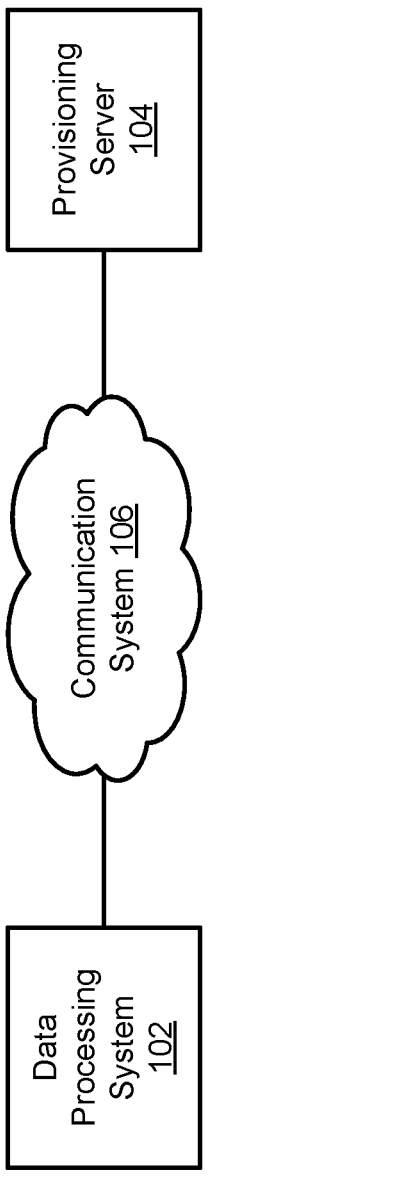
FIG. 1A shows a block diagram illustrating a distributed system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing a data processing system. The data processing system may provide computer-implemented services that may vary depending on the physical location of the data processing system. The computer-implemented services may, for example, be subject to policies associated with a geographical region (e.g., government laws and regulations associated with the geographical region, rules set forth by an administrator of the data processing system relevant to the geographical region, etc.). The policies may, for example, prohibit certain manners of operation of the data processing system (e.g., certain types of computer-implemented services) while the data processing system is present in the geographical region (e.g., in an embargoed country). Therefore, to avoid negative consequences associated with violating policies associated with the geographical region, operation of the data processing system (e.g., and therefore the computer-implemented services) may be managed based on the physical location of the data processing system.

To do so, a data processing system may include hardware resources (e.g., in-band components of the data processing system) that may transmit location data over a communication network such as a Wi-Fi network. For example, the data processing system may include a portable device, and the location data reported by the data processing system may be used to track the location of the data processing system as it is relocated over time. As the data processing system enters or exits a geographical region, operation of the data processing system may be updated (e.g., restricted) to reflect policies associated with the geographical region.

However, the data processing system may, for various reasons, become unable to provide location data that is reliable (e.g., trustworthy, accurate, up to date, etc.). For example, hardware resources of the data processing system may become unpowered for periods of time, may be unable to connect to a communication network, and/or may become compromised by a malicious party (e.g., that may tamper with the location data). If reliable location data for the data processing system is unavailable, then the operation of the data processing system (e.g., computer-implemented services provided by the data processing system) may not be properly managed. For example, when improperly managed, the operation of the data processing system may be more likely to violate applicable policies, which may result in legal liabilities, penalties, inadvertent exposure of sensitive data, etc.

Thus, to increase the likelihood of the data processing system operating in compliance with applicable policies, location data for the data processing system may be managed using out-of-band methods. The location data may be generated and/or obtained using out-of-band components (and/or via out-of-band communication channels) that function independently from in-band components (e.g., hardware resources) of the data processing system. Consequently, if in-band components and/or in-band communication channels are compromised or non-operational, then the location data provided using out-of-band methods may remain available and reliable.

By doing so, embodiments disclosed herein may provide a system for managing (operation of) a data processing system based on location-based policies. To do so, the data processing system may include out-of-band components such as a management controller. The management controller may, for example, obtain location data usable to identify applicable policies and/or may perform an action set based on the identified policies in order to update operation of the data processing system. Once updated, the data processing system, may be more likely to provide desired computer-implemented services (e.g., secure, uninterrupted, and/or otherwise policy compliant computer-implemented services).

In an embodiment, a computer-implemented method for managing a data processing system is provided. The method may include: obtaining, by a management controller of the data processing system and via an out-of-band communication channel, location data for the data processing system; and, identifying, by the management controller, applicability of at least one policy based on the location data.

In a first instance of the identifying where the at least one policy is applicable, the method may include making an identification regarding whether the data processing system is operating out of compliance with respect to the at least one policy.

In a first instance of the identification where the data processing system is operating out of compliance, the method may include: performing, by the management controller, an action set based on the at least one policy to update operation of the data processing system to improve compliance of the data processing system with respect to the at least one policy; and, providing, by the data processing system, a computer-implemented service based on the updated operation.

The method may further include, prior to obtaining the location data, obtaining, by the management controller and via the out-of-band communication channel, the at least one policy from a provisioning server.

The at least one policy may be enforced while the data processing system is within a geographical region. The at least one policy may indicate a desired manner of operation of the data processing system while the data processing system is within the geographical region.

To enter the desired manner of operation, an action set may be performed, and the action set may include disabling, by the management controller, a portion of hardware resources of the data processing system. The portion of the hardware resources may include a trusted platform module.

To enter the desired manner of operation, an action may be performed, and the action set may include disabling, by the management controller, a piece of software hosted by hardware resources of the data processing system.

The data processing system may include a network module adapted to separately advertise network endpoints for the management controller and hardware resources of the data processing system, the network endpoints being usable by a provisioning server to address communications to the hardware resources and the management controller.

The network module may include a location identification component usable for generating the location data. The location data may be provided to the management controller by the network module via the out-of-band communication channel.

The management controller and the network module may be on separate power domains from the hardware resources so that the management controller and the network module are operable while the hardware resources are inoperable. The location data may be generated by the network module while the hardware resources are inoperable due to being unpowered.

The out-of-band communication channel may run through the network module, and an in-band communication channel that services the hardware resources may also run through the network module.

A non-transitory media may include instructions that when executed by a processor cause the computer-implemented method to be performed.

The data processing system may include the non-transitory media and a processor, and may perform the computer-implemented method when the computer instructions are executed by the processor.

Turning to FIG. 1A, a block diagram illustrating a distributed system in accordance with an embodiment is shown. The (distributed) system shown in FIG. 1A may provide computer-implemented services. The computer-implemented services may include any type and quantity of services including, for example data services (e.g., data storage, access and/or control services), communication services (e.g., instant messaging services, video-conferencing services), and/or any other type of service that may be implemented with a computing device.

The computer-implemented services may be provided by one or more components of the system of FIG. 1A. For example, data processing system 102 may include portable devices that may provide computer-implemented services. The computer-implemented services may be subject to policies (e.g., guidelines, laws, regulations, etc.) that may be defined by government entities, administrators (e.g., of data processing system 102), etc., and/or that may be enforced within a geographical region. For example, depending on the physical location of data processing system 102, a computer-implemented service provided by data processing system 102 may violate export control laws and/or may be prohibited by other policies due to security issues.

Thus, operation of and/or computer-implemented services provided by a data processing system (e.g., of data processing system 102) may be modified (e.g., limited) based on the location of the data processing system in order to comply with location-based policies (e.g., policies that apply to the data processing system when the data processing system is located within a specified geographical region). However, location data provided by hardware resources of the data processing system used to determine the location of the data processing system may be unreliable and/or untrustworthy, which may prevent timely and/or appropriate enforcement of the location-based policies.

For example, the location data may be unreliable and/or untrustworthy when (i) the hardware resources may become unpowered while the data processing system in transit to a new location (e.g., unintentionally, or intentionally by a malicious party intending to conceal the new location of the data processing system), (ii) the hardware resources may be compromised (e.g., by a malicious party intending to spoof the location), (iii) the hardware resources may lack connection to a network used to establish in-band communication channels for transmitting location data to other devices, and/or (iv) the data processing system is otherwise unable to provide location data that accurately reflects the (current) location of the data processing system.

In general, embodiments disclosed herein may provide methods, systems, and/or devices for managing operation of a data processing system using location-based policies. The data processing system may include out-of-band components that may communicate with one another without traversing in-band communication channels and without utilizing in-band components. For example, the out-of-band components may manage location data for the data processing system, and may manage the enforcement of (pre-provisioned) location-based policies for the data processing system. By doing so, potentially compromised or inoperable in-band components may be circumvented, decreasing the likelihood of the location data becoming compromised (e.g., unreliable) and/or increasing the likelihood of the data processing system operating in compliance with applicable location-based policies (e.g., security policies, regulations, and/or legislation).

To perform the above-mentioned functionality, the system of FIG. 1A may include data processing system 102, and/or provisioning server 104. Data processing system 102, provisioning server 104, and/or any other type of devices not shown in FIG. 1A may perform all, or a portion of the computer-implemented services independently and/or cooperatively. Each of these components is discussed below.

Data processing system 102 may include any number and/or type of data processing systems. Data processing system 102 may provide computer-implemented services according to its physical location. To do so, data processing system 102 may include out-of-band components (e.g., a network module, a management controller, etc.), and functionality that may allow data exchange between the out-of-band components independently from in-band components of data processing system 102. For more information regarding out-of-band components of data processing system 102, refer to the discussion of FIG. 1B.

For example, the out-of-band components of data processing system 102 may (i) manage policies for data processing system 102 (e.g., obtained from provisioning server 104, via out-of-band communication channels), (ii) manage location data for data processing system 102, (ii) identify, based on the location data, policies applicable to data processing system 102, (iii) perform actions (e.g., of an action set) based on the applicable policies that may update operation of data processing system 102 (e.g., in order to improve compliance of data processing system 102 with respect to the policies), and/or (iv) perform other actions relating to facilitating data processing system 102 providing desired computer-implemented services.

Provisioning server 104 may include any number and/or type of servers (e.g., devices) that may provide computer-implemented services, such as provisioning services. To perform its functionality, provisioning server 104 may communicate (e.g., exchange data) with the out-of-band components of data processing system 102 using out-of-band communication channels. For example, provisioning server 104 may provide provisioning services for data processing system 102 via the management controller of data processing system 102 (e.g., bypassing any in-band components of data processing system 102).

To provide provisioning services, provisioning server 104 may, for example, (i) obtain provisioning requests (e.g., from the management controller via out-of-band communication channels), (ii) participate in authentication processes (e.g., in order to verify authenticity of devices such as data processing system 102), (iii) respond to provisioning requests (e.g., by providing provisioning data to the management controller), and/or (iv) perform other actions that may facilitate a provisioning process for data processing system 102. Refer to the discussion of FIG. 2A for more information regarding provisioning processes.

During the provisioning process, data processing system 102 may be provided with policies that are to be enforced based on the geographical location of data processing system 102. Therefore, out-of-band components of data processing system 102 may perform location monitoring processes, monitor the operation of (in-band components of) data processing system 102 to check for policy compliance, and/or perform policy enforcement processes that may update the operation of data processing system 102 according to the policies. Refer to the discussion of FIG. 2B for more information regarding policy enforcement.

Thus, the operation of data processing system 102 may be managed using out-of-band methods (e.g., using out-of-band components and via out-of-band communication channels). By doing so, the location data may be more likely to be reliable, appropriate policies may be more likely to be enforced in a timely manner, and/or data processing system 102 may be more likely to provide the desired computer-implemented services.

Figure 3A:
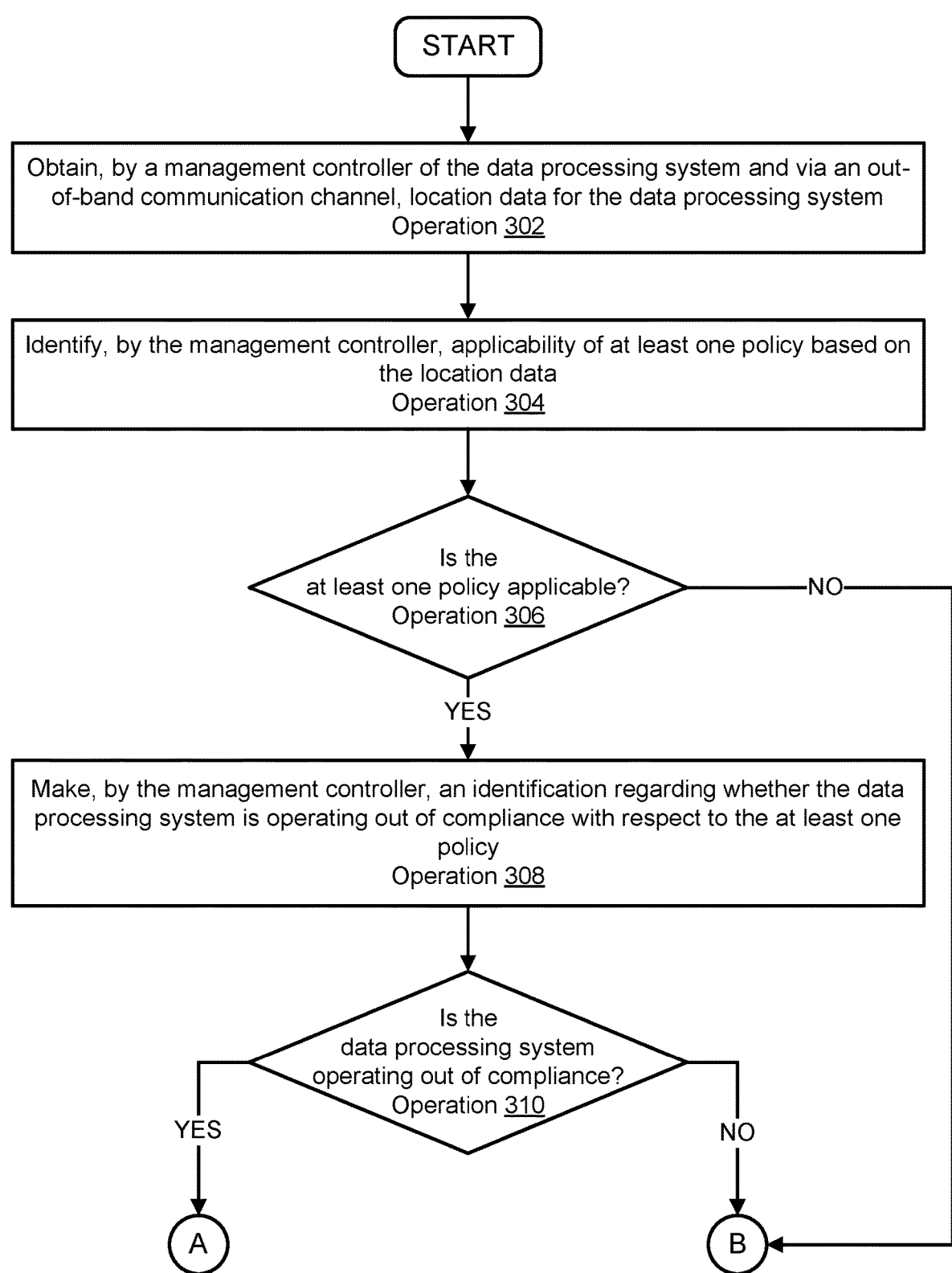
FIGS. 3A-3B show flow diagrams illustrating methods in accordance with an embodiment.
Figure 3B:
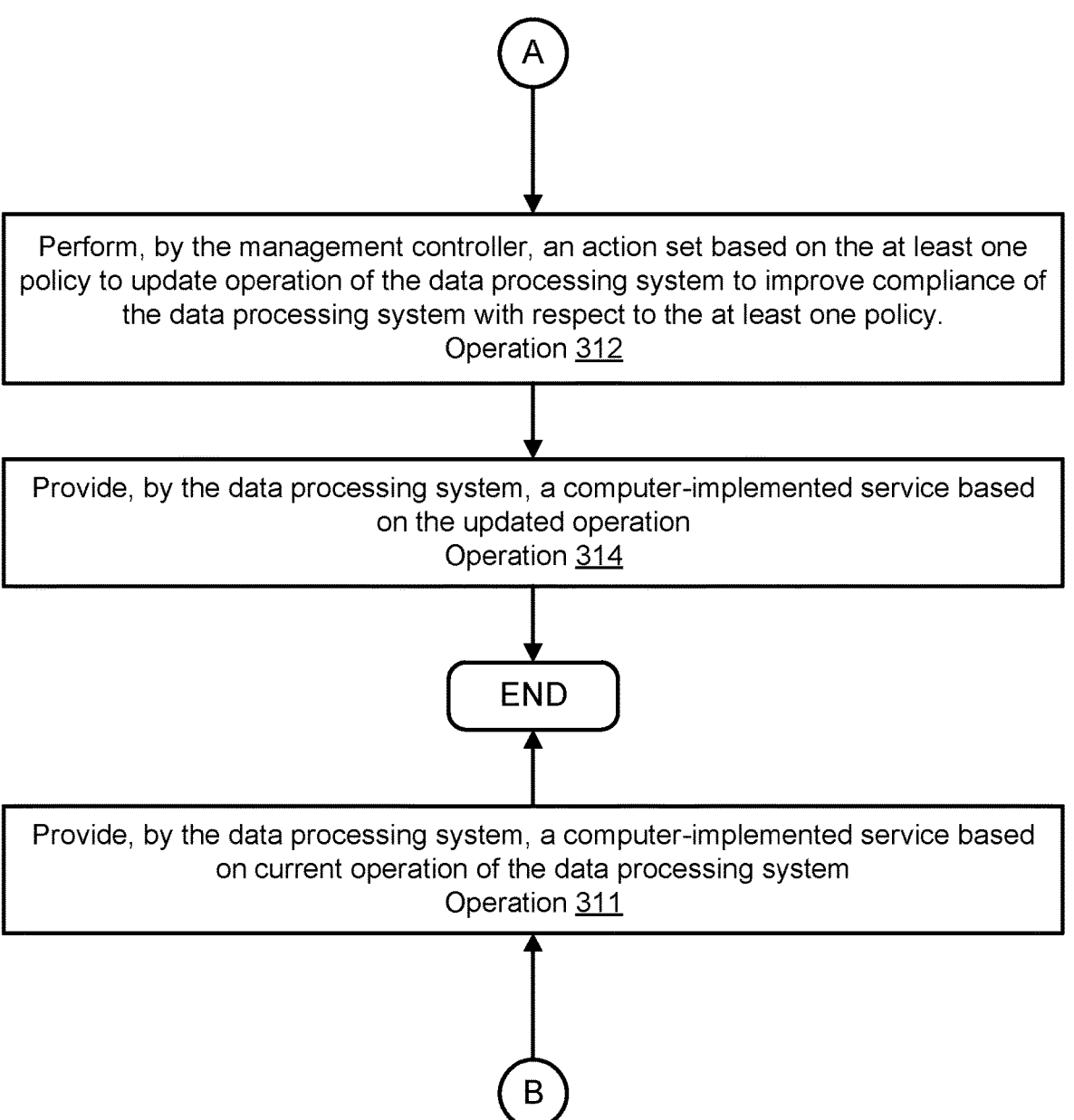

When providing their functionality, any of data processing system 102 and/or provisioning server 104 may perform all, or a portion of the methods shown in FIGS. 3A-3B.

Any of (and/or components thereof) data processing system 102 and/or provisioning server 104 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., smartphone), an embedded system, local controllers, an edge node, and/or any other type of data processing device or system. For additional details regarding computing devices, refer to the discussion of FIG. 4.

In an embodiment, one or more of data processing system 102 and/or provisioning server 104 are implemented using an internet of things (IoT) device, which may include a computing device. The IoT device may operate in accordance with a communication model and/or management model known to data processing system 102, provisioning server 104, and/or other devices.

Any of the components illustrated in FIG. 1A may be operably connected to each other (and/or components not illustrated) with communication system 106. In an embodiment, communication system 106 includes one or more networks that facilitate communication between any number of components. The networks may include wired networks and/or wireless networks (e.g., and/or the Internet). The networks may operate in accordance with any number and/or types of communication protocols (e.g., such as the internet protocol).

While illustrated in FIG. 1A as including a limited number of specific components, a system in accordance with an embodiment may include fewer, additional, and/or different components than those illustrated therein. For example, while the system of FIG. 1A shows a single data processing system (e.g., 102), it will be appreciated that the system may include any number of data processing systems.

Figure 1B:
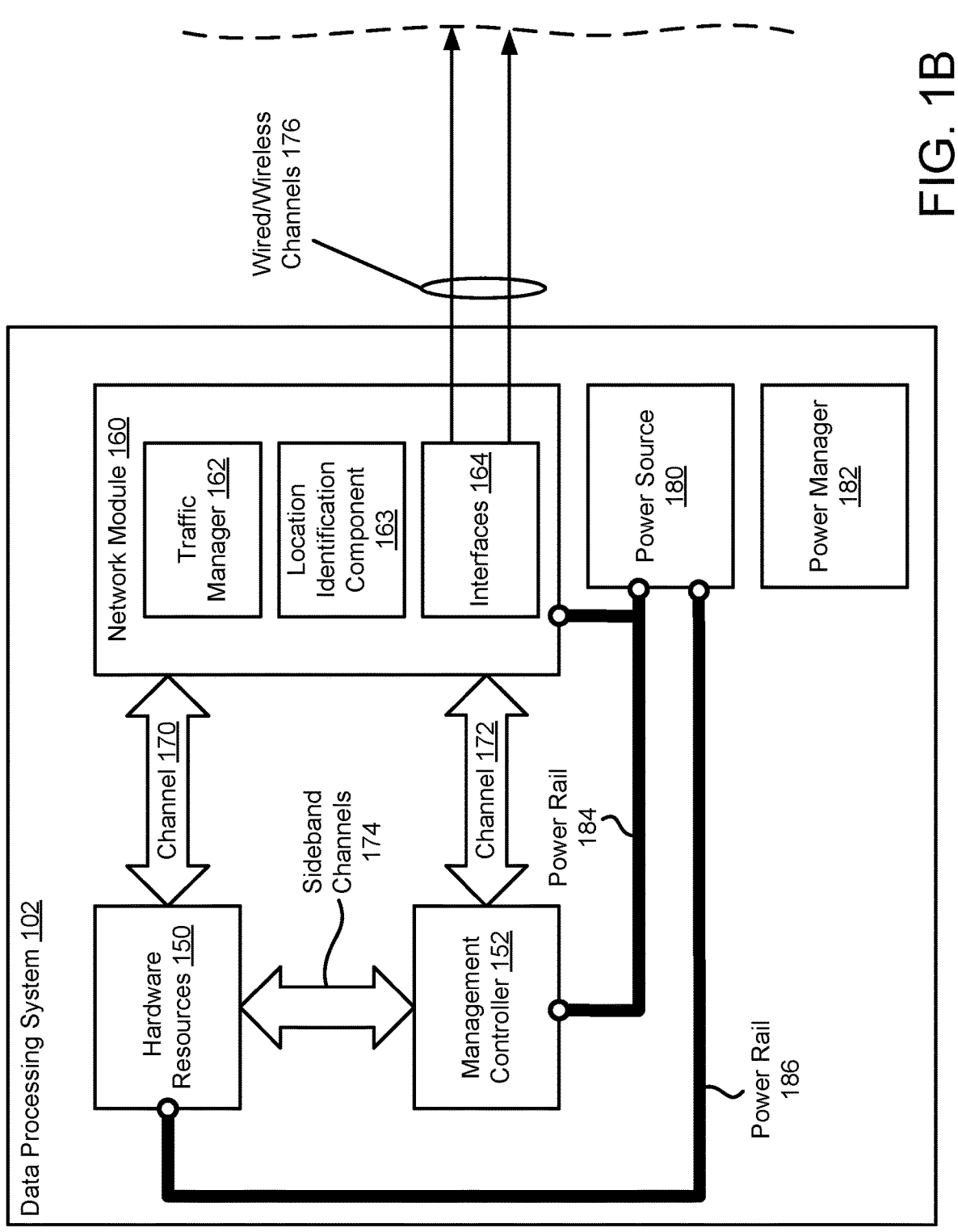
FIG. 1B shows a block diagram illustrating a data processing system in accordance with an embodiment.

Turning to FIG. 1B, a diagram illustrating a data processing system in accordance with an embodiment is shown. The data processing system (e.g., data processing system 102) shown in FIG. 1B may be similar to any of the computing devices (e.g., data processing system 102) shown in FIG. 1A.

To provide computer-implemented services, data processing system 102 may include any quantity of hardware resources 150. Hardware resources 150 may be in-band hardware components, and may include a processor operably coupled to memory, storage, and/or other hardware components.

The processor may host various management entities such as operating systems, drivers, network stacks, and/or other software entities that provide various management functionalities. For example, the operating system and drivers may provide abstracted access to various hardware resources. Likewise, the network stack may facilitate packaging, transmission, routing, and/or other functions with respect to exchanging data with other devices.

For example, the network stack may support transmission control protocol/internet protocol communication (TCP/IP) (e.g., the Internet protocol suite) thereby allowing the hardware resources 150 to communicate with other devices via packet switched networks and/or other types of communication networks.

The processor may also host various applications that provide the computer-implemented services. The applications may utilize various services provided by the management entities and use (at least indirectly) the network stack to communicate with other entities.

However, use of the network stack and the services provided by the management entities may place the applications at risk of indirect compromise. For example, if any of these entities trusted by the applications are compromised, then these entities may subsequently compromise the operation of the applications. For example, if various drivers and/or the communication stack are compromised, then communications to/from other devices may be compromised. If the applications trust these communications, then the applications may also be compromised.

For example, to communicate with other entities, an application may generate and send communications to a network stack and/or driver, which may subsequently transmit a packaged form of the communication via channel 170 to a communication component, which may then send the packaged communication (in a yet further packaged form, in some embodiments, with various layers of encapsulation being added depending on the network environment outside of data processing system 102) to another device via any number of intermediate networks (e.g., via wired/wireless channels 176 that are part of the networks).

To reduce the likelihood of the applications and/or other in-band entities from being indirectly compromised, data processing system 102 may include management controller 152 and network module 160. Each of these components of data processing system 102 is discussed below.

Management controller 152 may be implemented, for example, using a system on a chip or other type of independently operating computing device (e.g., independent from the in-band components, such as hardware resources 150 of a host data processing system 102). Management controller 152 may provide various management functionalities for data processing system 102. For example, management controller 152 may monitor various ongoing processes performed by the in-band components, may manage power distribution, thermal management, and/or may perform other functions for managing data processing system 102 (e.g., enforce policies that may modify the operation of hardware resources 150).

To do so, management controller 152 may be operably connected to various components via sideband channels 174 (in FIG. 1B, a limited number of sideband channels are included for illustrative purposes, it will be appreciated that management controller 152 may communicate with other components via any number of sideband channels). The sideband channels may be implemented using separate physical channels, and/or with a logical channel overlay over existing physical channels (e.g., logical division of in-band channels). The sideband channels may allow management controller 152 to interface with other components and implement various management functionalities such as, for example, general data retrieval (e.g., to snoop ongoing processes), telemetry data retrieval (e.g., to identify a health condition/other state of another component), function activation (e.g., sending instructions that cause the receiving component to perform various actions such as displaying data, adding data to memory, causing various processes to be performed), and/or other types of management functionalities.

For example, to reduce the likelihood of indirect compromise of an application hosted by hardware resources 150, management controller 152 may enable information from other devices to be provided to the application without traversing the network stack and/or management entities of hardware resources 150. To do so, the other devices may direct communications including the information to management controller 152.

Management controller 152 may then, for example, send the information via sideband channels 174 to hardware resources 150 (e.g., to store it in a memory location accessible by the application, such as a shared memory location, a mailbox architecture, or other type of memory-based communication system) to provide it to the application. Thus, the application may receive and act on the information without the information passing through potentially compromised entities. Consequently, the information may be less likely to also be compromised, thereby reducing the possibility of the application becoming indirectly compromised. Similarly, processes may be used to facilitate outbound communications from the applications.

Management controller 152 may be operably connected to communication components of data processing system 102 via separate channels (e.g., 172) from the in-band components, and may implement or otherwise utilize a distinct and independent network stack (e.g., TCP/IP). Consequently, management controller 152 may communicate with other devices independently of any of the in-band components (e.g., does not rely on any hosted software, hardware components, etc.). Accordingly, compromise of any of hardware resources 150 and hosted components may not result in indirect compromise of any management controller 152, and entities hosted by management controller 152.

For example, if hardware resources 150 are compromised as part of an attack, then management controller 152 may continue to manage the enforcement of policies that may modify (e.g., limit) the operation of hardware resources 150 in a manner that may mitigate an outcome of the attack.

To facilitate communication with other devices, data processing system 102 may include network module 160. Network module 160 may generate location data and/or provide communication services for in-band components and out-of-band components (e.g., management controller 152) of data processing system 102. To do so, network module 160 may include traffic manager 162, location identification component 163, and interfaces 164.

Traffic manager 162 may include functionality to (i) discriminate traffic directed to various network endpoints advertised by data processing system 102, and (ii) forward the traffic to/from the entities associated with the different network endpoints. For example, to facilitate communications with other devices, network module 160 may advertise different network endpoints (e.g., different media access control address/internet protocol addresses) for the in-band components and out-of-band components. Thus, other entities may address communications to these different network endpoints. When such communications are received by network module 160, traffic manager 162 may discriminate and direct the communications accordingly (e.g., over channel 170 or channel 172, in the example shown in FIG. 1B, it will be appreciated that network module 160 may discriminate traffic directed to any number of data units and direct it accordingly over any number of channels).

Accordingly, traffic directed to management controller 152 may never flow through any of the in-band components. Likewise, outbound traffic from the out-of-band component may never flow through the in-band components.

For example, a provisioning server (e.g., 104) may address a message to a network endpoint advertised by network module 160 for out-of-band communications. The message may include, for example, a response to a provisioning request (e.g., provisioning data for data processing system 102). Once the message is received by traffic manager 162, traffic manager 162 may forward the message to management controller 152 via an out-of-band communication channel (e.g., channel 172), differentiating the message from in-band communications to data processing system 102. Therefore, the provisioning data may be obtained using out-of-band methods and may be less likely to be intercepted and/or modified (e.g., by the malicious party) than when using in-band methods.

To support inbound and outbound traffic, network module 160 may include any number of interfaces 164. Interfaces 164 may be implemented using any number and type of communication devices which may each provide wired and/or wireless communication functionality. For example, interfaces 164 may include a wireless wide area network (WWAN) card, a Wi-Fi card, a wireless local area network card, a wired local area network card, an optical communication card, and/or other types of communication components. These component may support any number of wired/wireless channels 176.

To generate location data, network module 160 may include location identification component 163. Location identification component 163 may include a global positioning system (GPS) receiver (e.g., for satellite-based geolocation), a cellular modem or chip (e.g., for cellular-based geolocation using a WWAN), sensors, and/or other types of geolocation components. Location identification component 163 may, for example, transmit and/or receive data across a network via interfaces 164 in order to generate (e.g., triangulate) a location of data processing system 102. The location data may be forwarded by traffic manager 162 to management controller 152 via an out-of-band communication channel (e.g., channel 172), bypassing potentially compromised and/or unavailable hardware resources 150.

Thus, location data for data processing system 102 may be generated and/or provided by network module 160 independently from hardware resources 150 (e.g., and software hosted by hardware resources 150). Network module 160 may provide location data generated by location identification component 163 to management controller 152 automatically based on a schedule, upon (automatic) detection of a change in location data (e.g., based on a displacement threshold), and/or upon obtaining a request for location data (e.g., from management controller 152).

Thus, from the perspective of an external device, the in-band components and out-of-band components of data processing system 102 may appear to be two independent network entities that may be independently addressable and/or otherwise unrelated to one another.

To facilitate management of data processing system 102 over time, hardware resources 150, management controller 152 and/or network module 160 may be positioned in separately controllable power domains. By being positioned in these separate power domains, different subsets of these components may remain powered while other subsets are unpowered.

For example, management controller 152 and network module 160 may remain powered while hardware resources

150 is unpowered. Consequently, management controller 152 may remain able to communicate with other devices even while hardware resources 150 are inactive. Similarly, management controller 152 may perform various actions while hardware resources 150 are not powered and/or are otherwise inoperable, unable to cooperatively perform various process, are compromised, and/or are unavailable for other reasons. Therefore, if hardware resources 150 become unavailable (e.g., due to being unpowered) then out-of-band components may remain powered, allowing network module 160 to continue to generate location data for data processing system 102, and allowing management controller 152 to obtain the location data and/or to enforce policies based on the location data.

To implement the separate power domains, data processing system 102 may include a power source (e.g., 180) that separately supplies power to power rails (e.g., power rail 184, power rail 186) that power the respective power domains. Power from the power source (e.g., a power supply, battery, etc.) may be selectively provided to the separate power rails to selectively power the different power domains. A power manager (e.g., 182) that may manage power from power source 180 may be supplied to the power rails. Management controller 152 may cooperate with power manager 182 to manage supply of power to these power domains.

In FIG. 1B, an example implementation of separate power domains using power rails 184-186 is shown. The power rails may be implemented using, for example, bus bars or other types of transmission elements capable of distributing electrical power. While not shown, it will be appreciated that the power domains may include various power management components (e.g., fuses, switches, etc.) to facilitate selective distribution of power within the power domains.

Figure 2A:
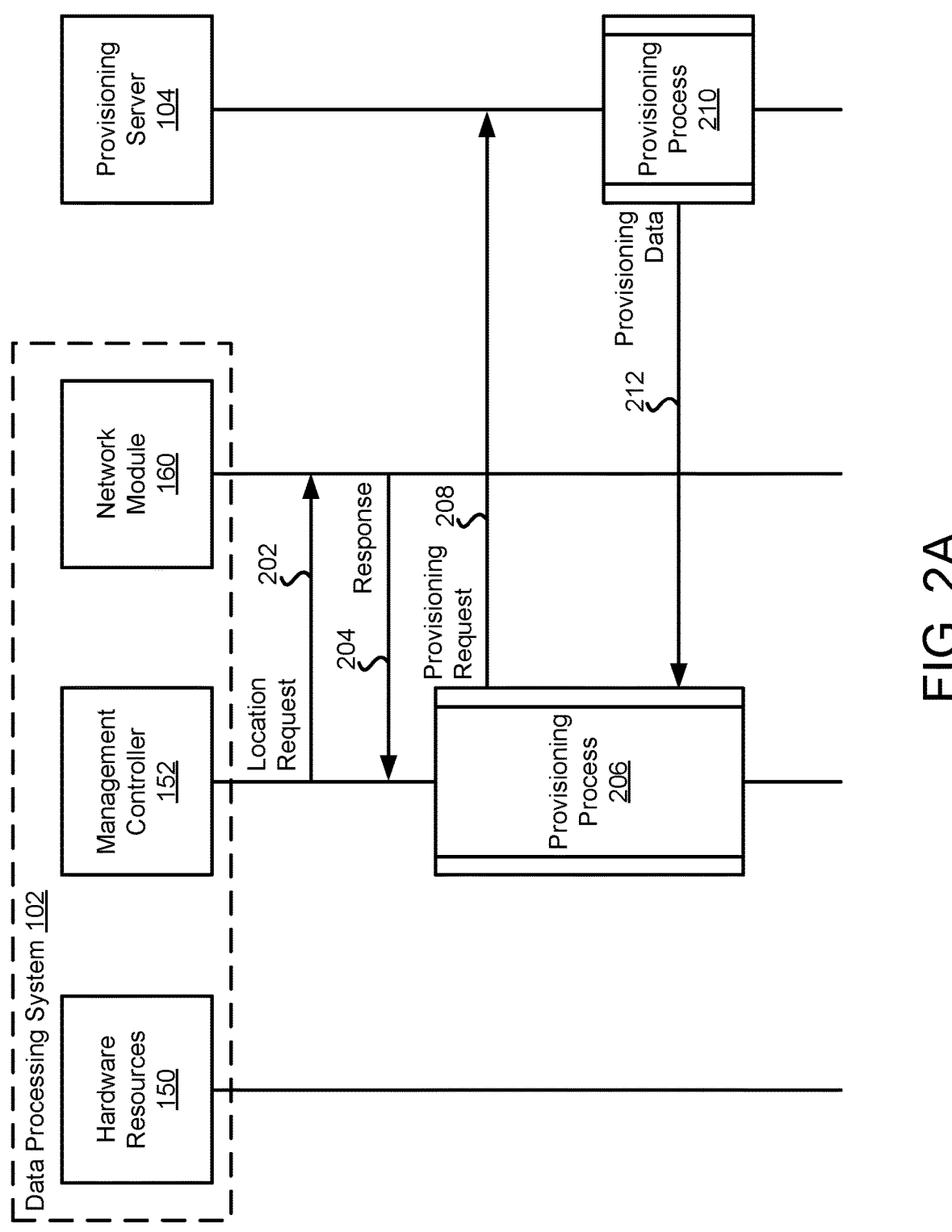
FIGS. 2A-2B show interaction diagrams in accordance with an embodiment.
Figure 2B:
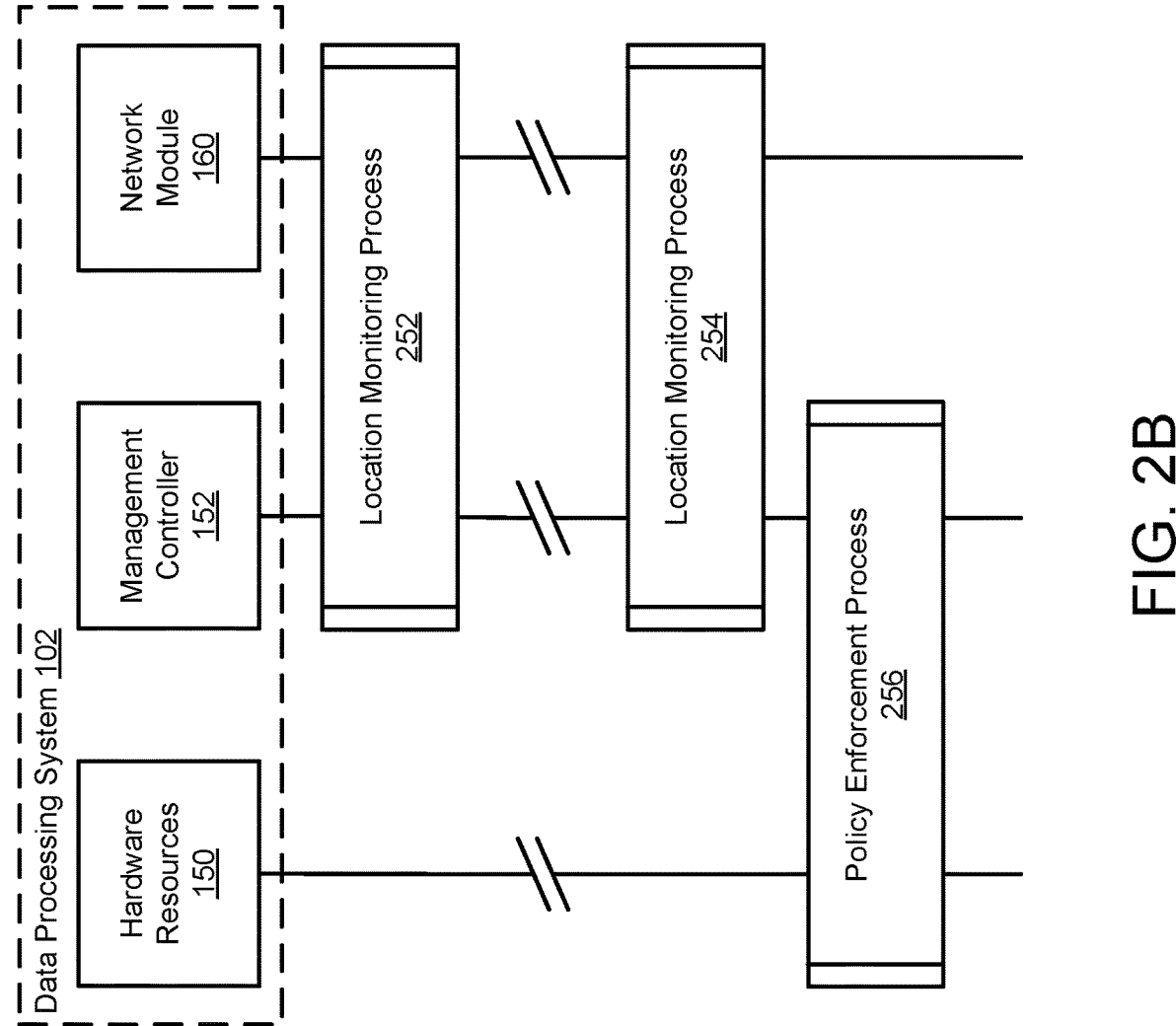

To further clarify embodiments disclosed herein, an interaction diagram in accordance with an embodiment is shown in each of FIGS. 2A-2B. The interaction diagrams may illustrate examples of how data may be obtained and used within the systems of FIGS. 1A-1B.

In the interaction diagrams, processes performed by and interactions between components of a system in accordance with an embodiment are shown. In the diagrams, components of the system are illustrated using a first set of shapes (e.g., 150, 152, etc.), located towards the top of each figure. Lines descend from these shapes. Processes performed by the components of the system are illustrated using a second set of shapes (e.g., 206, 210 etc.) superimposed over these lines.

Interactions (e.g., communication, data transmissions, etc.) between the components of the system are illustrated using a third set of shapes (e.g., 202, 204, etc.) that extend between the lines. The third set of shapes may include lines terminating in one or two arrows. Lines terminating in a single arrow may indicate that one-way interactions (e.g., data transmission from a first component to a second component) occur, while lines terminating in two arrows may indicate that multi-way interactions (e.g., data transmission between two components) occur.

Generally, the processes and interactions are temporally ordered in an example order, with time increasing from the top to the bottom of each page. For example, the interaction labeled as 202 may occur prior to the interaction labeled as 204. However, it will be appreciated that the processes and interactions may be performed in different orders, any may be omitted, and other processes or interactions may be performed without departing from embodiments disclosed herein.

Some of the lines descending from the first set of shapes are interrupted with line breaks. The line breaks may indicate, for example, a passage of time (e.g., between interactions and/or processes occurring above the line break and below other interactions and/or processes occurring below the line break), during which activity and/or events may occur.

The processes shown in FIGS. 2A-2B may be performed by any entity shown in the systems of FIGS. 1A-1B (e.g., a device similar to one of data processing system 102, a server similar to provisioning server 104, etc.) and/or another entity without departing from embodiments disclosed herein.

Turning to FIG. 2A, a first interaction diagram in accordance with an embodiment is shown. The first interaction diagram may illustrate processes and interactions that may occur in order to provide provisioning services for a data processing system. For example, data processing system 102 may include a portable device that may provide computer-implemented services. As discussed with respect to FIGS. 1A-1B, data processing system 102 may include hardware resources 150, management controller 152, and network module 160. Over time, network module 160 may generate location data usable to obtain a physical location of data processing system 102. Management controller 152 may monitor the location of data processing system 102, which may include obtaining location data generated by network module 160.

At interaction 202, a location request may be provided to network module 160 by management controller 152. For example, the location request may be generated and provided to network module 160 via an out-of-band communication channel (e.g., 172) through (i) transmission via a message, (ii) storing in a storage with subsequent retrieval by network module 160, (iii) a publish-subscribe system where network module 160 subscribes to updates from management controller 152 thereby causing a copy of the location request to be propagated to network module 160, and/or (iv) other processes. By providing the location request to network module 160, network module 160 may generate a response to the location request.

The location request may prompt network module 160 (e.g., location identification component 163 of network module 160) to generate location data for data processing system 102 (e.g., using a WWAN connection facilitated by interfaces 164 of network module 160). Network module 160 may generate the response to the location request, which may include current location data (e.g., coordinates, timestamp information, etc.) indicating a recent or current physical location for data processing system 102.

At interaction 204, the response may be provided to management controller 152 by network module 160. For example, the response may be provided (e.g., via the out-of-band communication channel) to management controller 152 through (i) transmission via a message, (ii) storing in a storage with subsequent retrieval by management controller 152, (iii) a publish-subscribe system where management controller 152 subscribes to updates from network module 160 thereby causing a copy of the response to be propagated to management controller 152, and/or (iv) other processes. By providing the response to management controller 152, management controller 152 may participate in a provisioning process for data processing system 102.

Management controller 152 may initiate the provisioning process based on the response. For example, management controller 152 may determine whether the location of data processing system 102 is approved for secure provisioning of data processing system 102. If the location is approved, then management controller 152 may initiate provisioning process 206.

During provisioning process 206, management controller 152 (e.g., generate) a provisioning request in order to obtain policies, configuration settings, software, etc., for data processing system 102. The provisioning request may include, for example, (i) identifying information (e.g., for data processing system 102 and/or a user thereof), (ii) location data for (e.g., the physical location of) data processing system 102, (iii) authentication information (e.g., usable to authenticate data processing system 102 and/or the user), and/or (iv) any other information usable for obtaining provisioning services for data processing system 102.

At interaction 208, the provisioning request may be provided by management controller 152 to provisioning server 104 (e.g., via an out-of-band communication channel) through (i) transmission via a message, (ii) storing in a storage with subsequent retrieval by provisioning server 104, (iii) a publish-subscribe system where provisioning server 104 subscribes to updates from management controller 152 thereby causing a copy of the provisioning request to be propagated to provisioning server 104, and/or (iv) other processes. By providing the provisioning request to provisioning server 104, provisioning server 104 may perform a provisioning process complementary to provisioning process 206.

Provisioning server 104 may obtain the provisioning request, and, based on information included in the provisioning request (e.g., based on if provisioning server 104 is able to authenticate data processing system 102), provisioning server may initiate provisioning process 210. During provisioning process 210, provisioning server 104 may use the location data to identify whether data processing system 102 is eligible for receiving provisioning services. For example, the data processing system may be required to be in a geological region that is considered secure (e.g., outside of an embargoed country) in order to be eligible for the provisioning services.

If data processing system 102 is eligible to receive the provisioning services, then provisioning process 210 may include identifying and/or obtaining provisioning data based on the provisioning request. The provisioning data may include information usable to set up infrastructure (e.g., virtual and/or physical components) of data processing system 102. For example, the provisioning data may include policies (e.g., management policies, security policies, embargo policies, etc.) and/or additional information related to the policies (e.g., geographical information relating to the policies, executable instructions for enforcing the policies, etc.). The policies may include location-based keyed to different geographical regions. For example, a policy may be keyed to a geographical region (e.g., defined by a geographical boundary) meaning that the policy is to be enforced while data processing system 102 is located within bounds of the geographical region.

At interaction 212, the provisioning data may be provided by provisioning server 104 to management controller 152 via the out-of-band communication channel through (i) transmission via a message, (ii) storing in a storage with subsequent retrieval by management controller 152, (iii) a publish-subscribe system where management controller 152 subscribes to updates from provisioning server 104 thereby causing a copy of the provisioning data to be propagated to management controller 152, and/or (iv) other processes. By providing the provisioning data to management controller 152, management controller 152 may complete provisioning process 206.

Management controller 152 may complete provisioning process 210 by, for example, obtaining the provisioning data, and performing actions indicated by instructions included in the provisioning data that may update the operation of and/or configuration settings of data processing system 102. For example, management controller 152 may store the policies, the additional information related to the policies, and/or other information included in the provisioning data locally (e.g., for direct access). Management controller 152 may access the policies (and other stored information) during other processes that may be performed to improve compliance of data processing system 102 with respect to one or more of the policies.

Thus, as shown in the example of FIG. 2A, a data processing system may manage its location data and location-based policies using out-of-band methods. For example, the location data may be generated and obtained out-of-band, and the location-based policies may be obtained during an out-of-band provisioning process. By avoiding in-band methods, the location data that may support the enforcement of the location-based policies may be more likely to be reliable and trusted for use in managing the operation of the data processing system.

Turning to FIG. 2B, a second interaction diagram in accordance with an embodiment is shown. The second interaction diagram may illustrate processes and interactions that may occur in order to enforce policies for a data processing system. For example, data processing system 102 may be present at a first location within a first geographical region, and may be operating in compliance with policies corresponding to the first geographical region. As discussed with respect to FIG. 2A, management controller 152 may monitor the location of data processing system 102. To do so, management controller 152 may perform location monitoring process 252.

Location monitoring process 252 may include data exchange between management controller 152 and network module 160 via an out-of-band communication channel (similar to methods described with respect to interactions 202-204 of FIG. 2A). During location monitoring process 252, management controller 152 may use the location data obtained from network module 160 to monitor compliance of data processing system 102 with policies (e.g., location-based policies obtained during a prior provisioning process of data processing system 102).

To monitor (operational) compliance of data processing system 102 with respect to policies, management controller 152 may use the location data (e.g., indicating a location of data processing system 102) to (i) identify a geographical region associated with the location data, (ii) identify policies that are applicable to data processing system 102 based on the geographical region (e.g., policies that apply while data processing system 102 is located within the geographical region), (iii) verify that hardware resources 150 of data processing system 102 are operating in a manner of operation specified by the applicable policies, (iv) initiate policy enforcement processes (e.g., when data processing system 102 is operating out of compliance with an applicable policy), and/or (v) perform other actions or processes associated with location monitoring and/or policy compliance (e.g., generate notifications regarding location and/or compliance of data processing system 102, etc.).

For example, the location data may indicate that data processing system 102 has remained in the first location and/or in the first geographical region, and management controller 152 may determine that data processing system 102 has remained operationally compliant with policies keyed to the first geographical area. Thus, management controller 152 may not initiate a policy enforcement process and may continue to monitor location data (e.g., the location of) of data processing system 102.

During location monitoring process 252, management controller 152 may track the location of data processing system 102 over time. For example, management controller 152 may request location data from network module 160 periodically over time (e.g., as data processing system 102 changes location) in order to estimate a trajectory of data processing system 102. By doing so, management controller 152 may predict a future location of data processing system 102 and/or may perform actions associated with the prediction.

For example, if management controller 152 predicts that data processing system 102 will enter an embargoed country (e.g., within a period of time inferior to a time threshold), management controller 152 may generate and/or provide a notification to entities (e.g., a user and/or an administrator of data processing system 102, devices used for managing location and/or compliance notifications, etc.). The notification may, for example, warn the user of functionality that may be limited or unavailable if data processing system 102 enters the embargoed country, instruct an administrator or other device managing data processing system 102 remotely to modify permission levels accordingly, etc.

Location monitoring process 252 may be performed irrespective of the status of hardware resources 150 (e.g., if hardware resources are unpowered, compromised, etc.). For example, management controller 152 may continue to obtain location data from network module 160 and may continue to verify which policies are being enforced independent of the status of hardware resources 150. Refer to the discussion of FIG. 1B regarding the functionality of out-of-band components of data processing system 102 with respect to hardware resources 150.

The line breaks occurring after location monitoring process 252 may indicate a passage of a period of time during which an event may occur. The event may include data processing system 102 entering or leaving a defined geographical region. In this example, during the period of time, data processing system 102 may be moved from the first location (e.g., in the first geographical region) to a second location in a second geographical region.

Management controller 152 may continue to monitor the location and/or operational compliance of data processing system 102 by performing location monitoring process 254, similar to location monitor process 252. Management controller 152 may obtain location data from network module 160 and may determine that data processing system 102 has moved to the second location (e.g., in the second geographical region). During location monitoring process 254, management controller 152 may identify that the second geographical region is keyed to policies different from those of the first geographical region.

For example, the first geographical region may include a non-embargoed country, and the second geographical region may include an embargoed country, a geographical region associated with a higher security risk than the first geographical region, etc. Therefore, the policies keyed to the second geographical region may be more restrictive than policies keyed to the first geographical region. Location monitoring process 254 may include identifying (e.g., by management controller 152) that data processing system 102 is operating out of compliance with respect to policies that apply to the second location. Thus, to improve compliance of data processing system 102 with respect to the applicable policies, management controller 152 may initiate a policy enforcement process.

During policy enforcement process 256, management controller 152 may enforce the applicable policies. The policies may indicate a desired manner of operation of data processing system 102; therefore, management controller 152 may automatically perform one or more actions (e.g., of an action set that is based on the applicable policies) that update the operation of data processing system 102 to improve compliance of data processing system 102 with respect to the applicable policies.

To perform the one or more actions, management controller 152 may communicate with hardware resources 150 over a side-band communication channel (e.g., 250). Performing (one or more actions of) the action set may include, for example, (i) disabling (or enabling) one or more of hardware resources 150, (ii) disabling (or enabling) one or more pieces of software hosted by hardware resources 150, (iii) increasing (or decreasing) authentication requirements (e.g., for access to a portion of functionality of data processing system 102), (iv) removing a portion of data stored by data processing system 102, (v) modifying the boot process for data processing system 102, and/or (vi) other actions relating to policy enforcement (e.g., generating policy enforcement notifications).

Disabling or enabling software may include, for example, encrypting portions of data stored by data processing system 102, limiting the use of applications (e.g., or a portion of functionality of the applications) hosted by hardware resources 150. For example, management controller 152 may disable all functionality of data processing system 102 (e.g., prevent hardware resources 150 from being powered), and/or management controller 152 may continue to perform location monitoring and/or location reporting processes (e.g., reporting location data to other devices via out-of-band communications). Any functionality may be modified, limited, etc., for a period of time and/or until applicable policies indicate the functionality should be enabled.

During policy enforcement process 256, management controller 152 may, for example, disable technology that cannot be exported (e.g., a graphics processing unit (GPU), encryption technology, etc.) and/or hardware resources 150 that may limit functionality of data processing system 102, such as a trusted platform module (TPM) of data processing system 102. For example, by disabling the TPM, access to and/or use of secrets stored by the TPM may be prevented. Consequently, data decryption functionality may be lost, signing ability of data structures for device verification may be lost, etc., which may increase the security of data stored by and/or accessible by data processing system 102.

Modifying the boot process for data processing system 102 may include updating instructions used by and/or providing instructions to the basic input output system (BIOS). For example, the BIOS may verify an embargo status before and/or during performance of a boot process for an operating system installed on data processing system 102. The embargo status may be verified by reading boot instructions (e.g., updated by management controller 152) and/or other types of data structures in which the embargo status may be stored. Based on the boot instructions, different boot paths may be taken. For example, the operating system may not load, portions of the operating system may be loaded, and/or other boot processes may be performed that result in limitations on the functionality of the device.

Performing the action set may also include generating and/or providing notifications regarding policy enforcement and/or updates to the location or operation of data processing system 102. For example, during the boot process, a user of data processing system 102 may be shown an error message indicating functionality of data processing system 102 may be limited due to the enforcement of location-based policies.

Management controller 152 may, for example, provide a similar notification to an administrator console (e.g., that may monitor and/or manage location-based policy enforcement) via an out-of-band communication channel, and/or may enable functionality that allows the administrator to update and/or control data processing system 102 (e.g., remotely, via the administrator console) via the out-of-band communication channel (e.g., over a network such as a WWAN), independently from the operating system. The administrator, for example, may initiate other actions to be performed by management controller 152 in order to improve the compliance of data processing system 102 with respect to the applicable policies.

Once policy enforcement process 256 has completed (e.g., the operation of data processing system 102 has been updated to improve compliance with the policies), data processing system 102 may provide computer-implemented services based on the updated operation of hardware resources 150. For example, by updating the operation of hardware resources 150, data processing system 102 may be able to provide the desired computer-implemented services, which may be expected by and/or relied upon by consumers of the computer-implemented services.

Thus, as shown in the example of FIG. 2B, operational compliance of a data processing system may be monitored and/or enforced using out-of-band methods. The out-of-band components of data processing system 102 may perform location monitoring processes (e.g., using out-of-band communication channels), which may include verifying compliance of data processing system 102 with respect to policies associated with the monitored location. When data processing system 102 is operating out of compliance, out-of-band components may perform a policy enforcement process that may modify (e.g., update) operation of the data processing system. The operational modifications may reflect changes in policies associated with a relocation of the data processing system, and may prevent the data processing system from providing computer-implemented services that may be out of compliance.

Any of the processes illustrated using the second set of shapes and interactions illustrated using the third set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes and interactions illustrated using the third set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor-based devices (e.g., computer chips).

Any of the processes and interactions may be implemented using any type and number of data structures. The data structures may be implemented using, for example, tables, lists, linked lists, unstructured data, data bases, and/or other types of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

As discussed above, the components of FIGS. 1A-2B may perform various methods to improve operational compliance of data processing systems with respect to one or more policies using out-of-band methods. By using out-of-band methods to enforce applicable policies, the data processing systems may be more likely to provide secure and reliable (e.g., desired) computer-implemented services.

FIGS. 3A-3B illustrate a method that may be performed by the components of the system of FIGS. 1A-2B. In the diagrams discussed below and shown in FIGS. 3A-3B, any of the operations may be repeated, performed in different orders, and/or performed in parallel with or in a partially overlapping in time manner with other operations. The method described with respect to FIGS. 3A-3B may be performed by a data processing system and/or another device.

Turning to FIG. 3A, at operation 302, the management controller of the data processing system may obtain location data for the data processing system via an out-of-band communication channel. The location data may be obtained using methods described with respect to FIGS. 2A-2B and/or by other out-of-band methods. For example, to avoid using any potentially unavailable hardware resources (e.g., in-band components) of the data processing system, the location data may be generated by a network module of the data processing system and/or may be provided (e.g., transmitted) to the management controller via the out-of-band communication channel. The location data may indicate a location of the data processing system.

Prior to obtaining the location data, management controller may obtain policies from a provisioning server. For example, the data processing system may undergo a provisioning process during which policies (e.g., location-based policies keyed to different geographical regions) are made available to the management controller by the provisioning server. Refer to the discussion of FIG. 2A for more details regarding provisioning processes.

At operation 304, the management controller may identify applicability of at least one policy (e.g., of the policies) based on the location data. The data processing system may identify the applicability of the at least one policy by performing a location monitoring process. For example, the location monitoring process may include (i) identifying a geographical region associated with the location of the data processing system (indicated by the location data), and/or (ii) looking up policies keyed to the geographical region. For example, management controller may use the geographical region as a search term to identify the at least one policy. For more information regarding location monitoring processes, refer to the discussion of FIG. 2B.

At operation 306, a determination may be made regarding whether the at least one policy is applicable. The applicability of the policy may be identified, as noted above, in operation 304. If the at least one policy is applicable (e.g., is keyed to the geographical region, the at least one policy may be applicable to the geographic region), then the method may proceed to operation 308. Otherwise, the method may proceed to operation 311 (via path "B", shown in FIG. 3B).

At operation 308, the management controller may make an identification regarding whether the data processing system is operating out of compliance with respect to the at least one policy. The identification may be made by comparing a current manner of operation of the data processing system with the desired manner of operation indicated by the at least one policy. For example, the management controller may verify settings and/or functionality of the data processing system by snooping activity and/or processes of the hardware resources, reading configuration settings, registry settings, BIOS settings, etc., to identify the current manner of operation.

At operation 310, a determination may be made regarding whether the data processing system is operating out of compliance with respect to the at least one policy. The determination may be made, as noted above, in operation 308. If the data processing system is not operating out of compliance with respect to the at least one policy (e.g., the data processing system is operating in compliance with respect to the at least one policy), then the method may proceed to operation 311 (via path "B", shown in FIG. 3B). Otherwise, the method may proceed to operation 312 (via path "A", shown in FIG. 3B).

Turning to FIG. 3B, a continuation of the flowchart shown in FIG. 3A in accordance with an embodiment is shown.

At operation 311, following path "B", the data processing system may provide a computer-implemented service based on current operation of the data processing system. The computer-implemented services may be provided by initiating current functionality of the hardware resources (e.g., provided by the current manner of operation) of the data processing system. For example, a user of the data processing system may initiate execution of computer instructions that may be performed by the hardware resources of the data processing system.

The method may end following operation 311.

Returning to operation 310 of FIG. 3A, the method may proceed, via path "A", to operation 312 when it is determined that the data processing system is operating out of compliance with respect to the at least one policy.

Returning to FIG. 3B, at operation 312, the management controller may perform an action set based on the at least one policy to update operation of the data processing system to improve compliance of the data processing system with respect to the at least one policy. The action set may be performed by (i) obtaining (e.g., generating) instructions based on the at least one policy, and/or (ii) executing the instructions in order to update the operation of the data processing system (e.g., enabling or disabling hardware and/or software, initiating processes, updating configuration settings, downloading data, installing software, etc.). For more information regarding action sets and policy enforcement, refer to the discussion of FIG. 2B.

At operation 314, the data processing system may provide a computer-implemented service based on the updated operation. The data processing system may provide a computer-implemented service by initiating updated functionality of the hardware resources of the data processing system. The computer-implemented services may be more likely to include desired (e.g., secure and/or policy compliant) computer-implemented services when performed using the updated hardware resources.

The method may end following operation 314.

As illustrated above, embodiments disclosed herein may provide systems and methods usable to manage data processing systems by enforcing location-based policies using out-of-band methods. By managing the location data and the enforcement of location-based policies without relying on in-band methods (which may be inoperable and/or insecure), the likelihood of the location data being modified, leaked, and/or otherwise compromised may be reduced, and the likelihood of enforcing appropriate policies may be increased. By enforcing the appropriate policies, computer-implemented services provided by the data processing system may be more likely to be desirable.

The operation of the data processing system may be managed according to the location-based policies automatically and/or in real-time, reducing the likelihood of service disruptions, policy violations, and/or security issues that may arise while providing computer-implemented services. Accordingly, the disclosed process provides for both an embodiment in computing technology and an improved method for managing the security of data processing systems.

Figure 4:
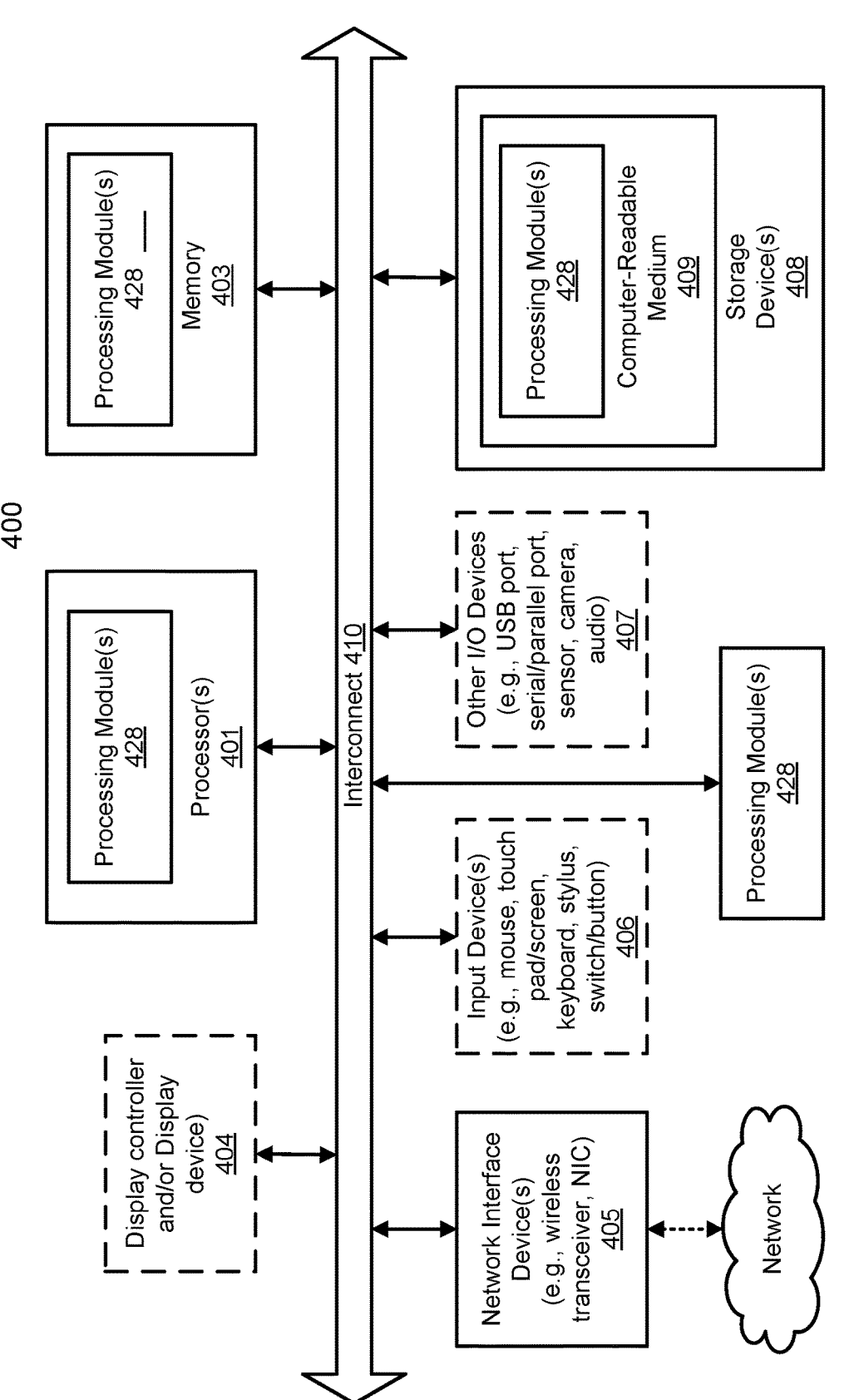
FIG. 4 shows a block diagram illustrating a data processing system in accordance with an embodiment.

Any of the components illustrated in FIGS. 1A-3B may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high-level view of many components of the computer system. However, it is to be understood that additional components may be present in certain implementations and furthermore, different arrangement of the components shown may occur in other implementations.

System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-408 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets.

Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random-access memory (RAM), dynamic RAM (DRAM), synchronous DRAM (SDRAM), static RAM (SRAM), or other types of storage devices. Memory 403 may store information including sequences of instructions that are executed by processor 401, or any other device.

For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a Wi-Fi transceiver, an infrared transceiver, a Bluetooth transceiver, a WiMAX transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid-state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also, a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs, or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components, or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing a data processing system, the method comprising:

obtaining, by a management controller of the data processing system and via an out-of-band communication channel, at least one policy from a provisioning server, wherein the at least one policy is to be enforced while the data processing system is within a geographical region and indicates a desired manner of operation of the data processing system while the data processing system is within the geographical region;

after obtaining the at least one policy, obtaining, by the management controller and via the out-of-band communication channel, location data for the data processing system, the data processing system comprises a single network module that is shared by both of the management controller and hardware resources of the data processing system, and the single network module being adapted to separately advertise network endpoints for the management controller and the hardware resources such that first communications meant for the hardware resources never flow through the management controller and second communications meant for the management controller never flow through the hardware resources;

identifying, by the management controller, applicability of the at least one policy based on the location data; and in a first instance of the identifying where the at least one policy is applicable:

making an identification regarding whether the data processing system is operating out of compliance with respect to the at least one policy, and in a first instance of the identification where the data processing system is operating out of compliance:

performing, by the management controller, an action set based on the at least one policy to update operation of the data processing system to improve compliance of the data processing system with respect to the at least one policy; and providing, by the data processing system, a computer-implemented service based on the updated operation, wherein to enter the desired manner of operation, an action set is performed, the action set comprising disabling, by the management controller, a trusted platform module of the data processing system.

2. The method of claim 1, wherein to enter the desired manner of operation, the action set comprises:

disabling, by the management controller, a piece of software hosted by the hardware resources of the data processing system.

3. The method of claim 1, wherein the network endpoints are used by the provisioning server to address the first communications to the hardware resources and the second communications to the management controller.

4. The method of claim 3, wherein the single network module comprises a location identification component usable for generating the location data.

5. The method of claim 4, wherein the location data is provided to the management controller by the single network module via the out-of-band communication channel.

6. The method of claim 3, wherein the management controller and the single network module are on separate power domains from the hardware resources so that the management controller and the single network module are operable while the hardware resources are inoperable.

7. The method of claim 6, wherein the location data is generated by the single network module while the hardware resources are inoperable due to being unpowered.

8. The method of claim 3, wherein the out-of-band communication channel runs through the single network module, and an in-band communication channel that services the hardware resources also runs through the single network module.

9. A non-transitory machine-readable medium having instructions stored therein, which when executed by a processor of a data processing system, cause the processor to perform operations for managing the data processing system, the operations comprising:

obtaining, by a management controller of the data processing system and via an out-of-band communication channel, at least one policy from a provisioning server, wherein the at least one policy is to be enforced while the data processing system is within a geographical region and indicates a desired manner of operation of the data processing system while the data processing system is within the geographical region;

after obtaining the at least one policy, obtaining, by the management controller and via the out-of-band communication channel, location data for the data processing system, the data processing system comprises a single network module that is shared by both of the management controller and hardware resources of the data processing system, the hardware resources comprise the processor, and the single network module being adapted to separately advertise network endpoints for the management controller and the hardware resources such that first communications meant for the hardware resources never flow through the management controller and second communications meant for the management controller never flow through the hardware resources;

identifying, by the management controller, applicability of the at least one policy based on the location data; and in a first instance of the identifying where the at least one policy is applicable:

making an identification regarding whether the data processing system is operating out of compliance with respect to the at least one policy, and in a first instance of the identification where the data processing system is operating out of compliance:

performing, by the management controller, an action set based on the at least one policy to update operation of the data processing system to improve compliance of the data processing system with respect to the at least one policy; and providing, by the data processing system, a computer-implemented service based on the updated operation,

wherein to enter the desired manner of operation, an action set is performed, the action set comprising disabling, by the management controller, a trusted platform module of the data processing system.

10. The non-transitory machine-readable medium of claim 9, wherein to enter the desired manner of operation, the action set comprises disabling, by the management controller, a piece of software hosted by the hardware resources of the data processing system.

11. The non-transitory machine-readable medium of claim 9, wherein the network endpoints are used by the provisioning server to address the first communications to the hardware resources and the second communications to the management controller.

12. The non-transitory machine-readable medium of claim 11, wherein the single network module comprises a location identification component usable for generating the location data.

13. The non-transitory machine-readable medium of claim 12, wherein the location data is provided to the management controller by the single network module via the out-of-band communication channel.

14. The non-transitory machine-readable medium of claim 11, wherein the management controller and the single network module are on separate power domains from the hardware resources so that the management controller and the single network module are operable while the hardware resources are inoperable.

15. A data processing system, comprising:
a processor; and
a memory coupled to the processor to store instructions, which when executed by the processor, cause the processor to perform operations for managing the data processing system, the operations comprising:
obtaining, by a management controller of the data processing system and via an out-of-band communication channel, at least one policy from a provisioning server, wherein the at least one policy is to be enforced while the data processing system is within a geographical region and indicates a desired manner of operation of the data processing system while the data processing system is within the geographical region;
after obtaining the at least one policy, obtaining, by the management controller and via the out-of-band communication channel, location data for the data processing system, the data processing system comprises a single network module that is shared by both of the management controller and hardware resources of the data processing system, the hardware resources comprise the processor, and the single network module being adapted to separately advertise network endpoints for the management controller and the hardware resources such that first communications meant for the hardware resources never flow through the management controller and second communications meant for the management controller never flow through the hardware resources,
identifying, by the management controller, applicability of the at least one policy based on the location data, and
in a first instance of the identifying where the at least one policy is applicable:
making an identification regarding whether the data processing system is operating out of compliance with respect to the at least one policy; and
in a first instance of the identification where the data processing system is operating out of compliance:
performing, by the management controller, an action set based on the at least one policy to update operation of the data processing system to improve compliance of the data processing system with respect to the at least one policy, and
providing, by the data processing system, a computer-implemented service based on the updated operation,
wherein to enter the desired manner of operation, an action set is performed, the action set comprising disabling, by the management controller, a trusted platform module of the data processing system.

16. The data processing system of claim 15, wherein to enter the desired manner of operation, the action set comprises disabling, by the management controller, a piece of software hosted by the hardware resources of the data processing system.

17. The data processing system of claim 15, wherein the network endpoints are used by the provisioning server to address the first communications to the hardware resources and the second communications to the management controller.

18. The data processing system of claim 17, wherein the single network module comprises a location identification component usable for generating the location data.

19. The data processing system of claim 18, wherein the location data is provided to the management controller by the single network module via the out-of-band communication channel.

20. The data processing system of claim 17, wherein the management controller and the single network module are on separate power domains from the hardware resources so that the management controller and the single network module are operable while the hardware resources are inoperable.

* * * * *